United States Patent [19]

Hang et al.

[11] Patent Number: 5,710,595

[45] Date of Patent: Jan. 20, 1998

[54] METHOD AND APPARATUS FOR CONTROLLING QUANTIZATION AND BUFFERING FOR DIGITAL SIGNAL COMPRESSION

[75] Inventors: Hsueh-Ming Hang, Hsin-Chu, Taiwan; Barin Geoffry Haskell, Tinton Falls; Shei-Zein Kiang, Marlboro Township, both of N.J.

[73] Assignee: Lucent Technologies Inc., Murray Hill, N.J.

[21] Appl. No.: 367,375

[22] Filed: Dec. 29, 1994

[51] Int. Cl.⁶ .................. H04N 7/32; H04N 7/30
[52] U.S. Cl. ........................... 348/419; 348/405
[58] Field of Search ................... 348/419, 405, 348/406, 384, 390, 699; H04N 7/32, 7/30

[56] References Cited

U.S. PATENT DOCUMENTS

| | | | |
|---|---|---|---|
| 5,134,476 | 7/1992 | Aravind et al. | 348/405 |
| 5,164,828 | 11/1992 | Tahara et al. | 348/419 |
| 5,231,484 | 7/1993 | Gonzales et al. | 348/405 |
| 5,241,401 | 8/1993 | Fujiwara et al. | 348/405 |
| 5,253,054 | 10/1993 | Fujiwara et al. | 348/419 |
| 5,331,348 | 7/1994 | Knauer et al. | 348/419 |
| 5,452,103 | 9/1995 | Brusewitz | 348/419 |
| 5,502,494 | 3/1996 | Auld | 348/426 |
| 5,517,253 | 5/1996 | De Lange | 348/513 |
| 5,543,853 | 8/1996 | Haskell et al. | 348/419 |

OTHER PUBLICATIONS

Puri, A., and Arovnd, R., "Motion—compensated Video Coding with Adaptive Perceptual Quantization," IEEE Transactions on Circuits and Systems for Video Technology, vol. 1, No. 4, Dec. 1991, pp. 351–361.

"Reference Model 8 (RM8)," CCITT SGXV Specialist Group on Coding for Visual Telephony, Jun. 9, 1989.

"Video Codec Test Model," TMN2, May 1994.

*Primary Examiner*—Tommy P. Chin
*Assistant Examiner*—Vu Le

[57] ABSTRACT

A method and apparatus for controlling quantization and buffering for video digital signal compression wherein a processor determines a bit budget value based on a number of frames to be skipped and a target buffer fullness. The bit budget value is used to retrieve a default Q-step value from a table of default quantization step size values and corresponding bit budget values. A default Q-step value is used to quantize the input digital signal only if it is less than a maximum. If, however, the default quantization step size value exceeds the maximum, then the number of frames to be skipped and the target buffer fullness may be increased to achieve a lower default quantization step size.

24 Claims, 4 Drawing Sheets

METHOD AND APPARATUS FOR CONTROLLING QUANTIZATION AND BUFFERING FOR DIGITAL SIGNAL COMPRESSION

FIELD OF THE INVENTION

This invention relates to the field of digital signal compression and more particularly to the quantization and buffering of a digital signal for digital signal compression.

BACKGROUND OF THE INVENTION

Digital signal compression, which reduces the bandwidth required to transmit digital data, such as digital video data, has many applications and will have many more applications in the future. In particular, real time digital video signal compression has significant potential for use in desktop video applications.

Digital signal compression systems typically include an encoder and a decoder. The encoder compresses or encodes a digital data signal which is then transmitted to a remote destination. The decoder, which is located at the destination, decompresses the data signal for subsequent use.

Encoder circuits in such systems typically include a quantization circuit that operates to compress the digital data signal. The encoder circuit also includes a buffer that regulates the flow of data between the quantization circuit and a data transmission device.

In an encoder circuit used in video applications, an input video digital signal is typically compressed one frame at a time, where a frame is one complete picture or screen of a video signal. Various techniques may be employed to compress the video data, including prediction error coding. Most compression techniques exploit the repetitive nature of video data. Such repetition may occur within a video frame, such as repetition between consecutive picture elements or pixels. Alternatively, repetition of portions of the video image may occur between consecutive frames. Such comparison techniques are known, and include, for example, Px64 and MPEG-based techniques.

Encoders usually operate on video data having a constant frame rate measured in frames per second. Because the amount of repetition within a video frame differs, encoder circuits produce different quantities of output data for each encoded frame. As a result, encoder circuits often produce varying output bit rates. Video transmission standards, however, ordinarily require that a constant output bit rate be transmitted. Consequently, the encoder buffer is employed to receive the variable bit rate encoded signal and provide the data for transmission at a constant bit rate.

The buffer operates on the "leaking bucket" principle. Under this principle, the buffer produces a constant output rate which translates to a constant number of bits for the duration of each frame. The leaking bucket principle assumes that encoded frames having more data bits and encoded frames having less data bits will more or less compensate for each other over time, so that the buffer never gets too full or too empty. If, however, several consecutive frames requiring a large number of bits are provided to the buffer, the buffer may become over-filled, resulting in transmission delay. Likewise, if several consecutive frames require few bits, the buffer will not be able to provide enough bits at its constant output bit rate.

To prevent such problems, the circuit may adjust the picture quality in order to increase or decrease the number of bits required to encode subsequent frames. The quality of the image of a frame is determined in part by a parameter called the quantization step size value ("Q-step value"). For example, if the Q-step value is high, relatively few bits are required to encode a frame, but the picture quality is sacrificed. Therefore, when possible, it is preferable to use a relatively low Q-step value.

To regulate the buffer fullness, the encoder will at the beginning of each frame determine the number of bits available based on a target buffer fullness and the actual buffer fullness. A Q-step value is then chosen that corresponds to the bits available. For example, if the number of bits available is relatively high, then the Q-step value may be set low to allow a more accurate, and less compressed estimation of the frame of the input video digital signal using a greater number of bits. If, however, there are relatively few bits available for encoding, then the Q-step value is set high, providing a rougher, more compressed, estimation of the frame of the input video digital signal.

A technique for adjusting the Q-step value based on the buffer fullness, as discussed above, is disclosed in U.S. Pat. No. 5,134,476 to Aravind et al. which is incorporated by reference herein. While this technique ensures a consistent data flow, there are situations where the video picture quality may suffer. For example, if the actual buffer fullness at the end of a frame is extremely high, the encoder will increase the Q-step value to an excessively high value, substantially degrading the picture quality. As a result, a technique is needed for providing a more consistently clear displayed video signal while maintaining simplicity and lower cost.

SUMMARY OF THE INVENTION

The present invention provides an improved method of buffering and controlling the encoder buffer fullness by limiting the Q-step value to a predetermined maximum. This maximum or threshold is set to a value that provides a tolerable level of image quality degradation. According to one aspect of the present invention, when the buffer fullness would ordinarily require an excessively high Q-step value for a subsequent frame, the present invention makes other adjustments, such as skipping the next frame to be encoded or increasing the target buffer fullness. As a result, adjustment of the Q-step value may be limited, thus improving video frame display quality.

An apparatus according to the invention includes a video signal source, a video encoder, a decoder, and a video display. The video encoder includes a quantization circuit, an encoder buffer, a processor, and a memory.

In this embodiment, a number of frames to be skipped, FSK, and the target buffer fullness, TBF, are preferably initially set by a user. Next, a first bit budget value for the encoder buffer is preferably determined based on the number of frames to be skipped, the target buffer fullness, the data transmission rate and the current buffer fullness. Then, the processor uses the first bit budget value to retrieve a corresponding default Q-step value, stored, for example, in a table in memory. Preferably, if the retrieved default Q-step value is less than a maximum, it is used to quantize a portion of an input digital signal. If, however, the retrieved default quantization step size exceeds an acceptable level, then either the number of frames to be skipped, FSK, or the target buffer fullness, TBF, is increased until the retrieved Q-step value is less than a maximum.

The above discussed features, as well as additional features and advantages of the present invention, will become more readily apparent by reference to the following detailed description and the accompanying drawings.

DETAILED DESCRIPTION OF THE DRAWINGS

Figure 1:
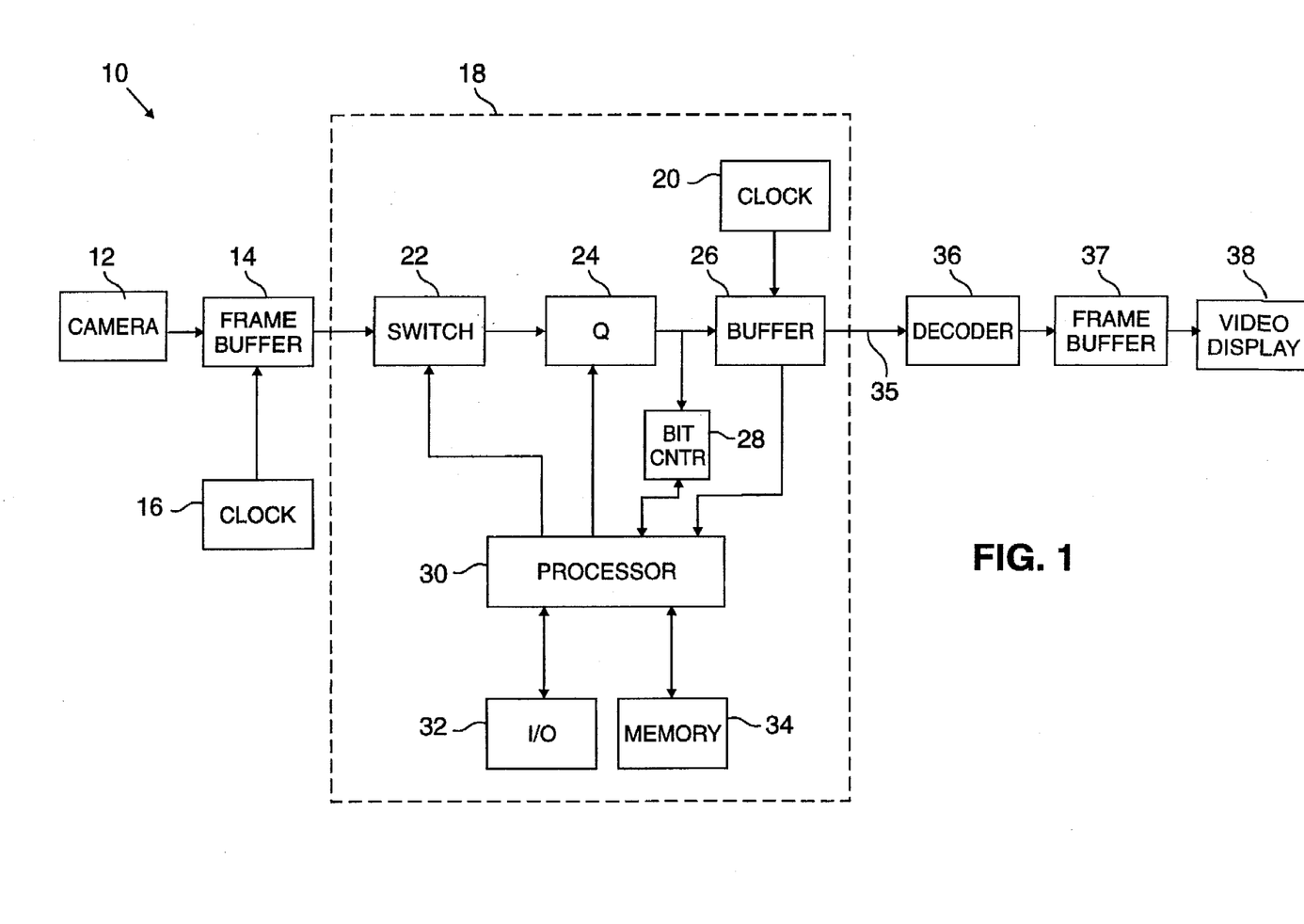
FIG. 1 is a block diagram of an apparatus for compressing and displaying digital video signals in accordance with the present invention.

FIG. 1 is a block diagram of a first embodiment of a system 10 for the transmission of one or more frames of an input digital video signal in accordance with the present invention. As shown in FIG. 1, the system 10 comprises a camera 12, a video frame buffer 14, an encoder 18, a decoder 36, a video frame buffer 37, and a display 38. Although the encoder 18 and decoder 36 are shown adjacent each other, they are preferably in separate locations and may be separated by a large distance.

The camera 12 is connected to the video frame buffer 14, which is in turn connected to a video clock 16. The video frame buffer 14 is connected to the encoder 18. The encoder 18 may suitably comprise a switch 22, a quantization circuit 24, a processor 30, an encoder buffer 26 and a bit counter 28, although other embodiments of an encoder may suitably be employed. The switch 22 and the quantization circuit 24 are connected to the outputs of the processor 30 while the encoder buffer 26 and the bit counter 28 are connected to inputs of the processor 30. The encoder 18 may further comprise an operator entry device 32 and a memory 34 which are connected to the processor 30, and a channel clock 20 which is connected to encoder buffer 26. The bit counter 28 is also connected to the output of the quantization circuit 24.

The encoder 18 is connected to the decoder 36 by a channel 35. The channel 35 may be a wireless transmission channel. The decoder 36 is connected to a video frame buffer 37 which is connected to the display 38. The decoder 36 preferably includes a channel clock and a channel buffer, not shown, as is known in the art. The channel clock of the decoder 36 synchronizes transmission of the encoded digital data over channel 35. The video frame buffer 37 preferably includes a video clock, not shown, also known in the art. The video clock of the video frame buffer 37 synchronizes the video signal. The buffer 37 is provided in part because the decoder 36 decodes the encoded bits at varying speeds, and the display 38 displays images at a constant speed.

In the general operation of the system 10 of FIG. 1, the camera 12 provides a video signal to the video frame buffer 14. The video frame buffer 14 receives the bits of the video signal at a constant bit rate. The buffer 14 thereafter provides an output signal to the encoder 18 at a bit rate controlled by the video clock 16. The encoder 18 thereafter provides a compressed video signal over the channel 35 to a remotely located decoder 36, frame buffer 37 and video display 38. The channel 35 has a constant bit rate which is usually lower than the bit rate of the clock 16.

The operations of the encoder 18 are discussed in more detail, below, in connection with FIG. 2. In general, however, the processor 30 of the encoder 18 determines, among other things, a preliminary quantization step size value ("Q-step value") based upon the available buffer space as measured by the buffer fullness status. The processor 30 then determines whether the current frame should be encoded. In some instances the Q-step value will be too high to provide an accurate estimation of a frame of a digital signal. According to the present invention, in those instances it is better to skip that frame of the input video sequence, in spite of the loss of information, so that no new storage locations in the encoder buffer 26 become occupied. Frame skipping allows more storage locations in the encoder buffer 26 to become available for encoding subsequent frames. With more storage locations, a lower Q-step value can be used and consequently a more accurate, less compressed estimation of a subsequent frame of a digital signal can be made.

The processor 30 further determines whether too many consecutive frames are scheduled to be skipped. If so, then the processor 30 increases the target fullness of the encoder buffer 26. Increasing the target buffer fullness, however, may increase the delay in frame transmission. Nevertheless, the delay added by increasing the buffer fullness may sometimes be less detrimental than skipping another frame. Such control of the target buffer fullness, as well as the number of frames to be skipped, is discussed in further detail below in connection with FIG. 2.

If it is determined that the current frame is to be encoded, the processor 30 sends the Q-step value to the quantization circuit 24. The processor 30 then turns on the switch 22 to allow the frame to be sent to the quantization circuit 24. The quantization circuit 24 then quantizes the frame data according to the Q-step value. Because the actual number of output bits may differ from the estimate for the Q-step value, the Q-step value may be adjusted from time to time during the encoding of a frame. The quantization of the frame of the video digital signal will also be described in further detail with reference to FIG. 2.

The bit counter 28 then counts the number of bits in the quantized signal and sends the resulting count value to the processor 30. The quantized data signal is also sent to the encoder buffer 26, where it is stored. The encoder buffer 26 sends the quantized data signal to the channel 35 at a constant bit rate controlled by the channel clock 20. Subsequently, the quantized data signal or compressed video signal is transmitted over the channel 35 to the decoder 36, which decodes the signal. The decoded signal is then sent to the frame buffer 37 and then the video display 38.

The processor 30 also receives system parameters for controlling the quantization and buffering operations from the operator entry device 32 and the memory 34. These parameters are discussed further below.

Figure 2:
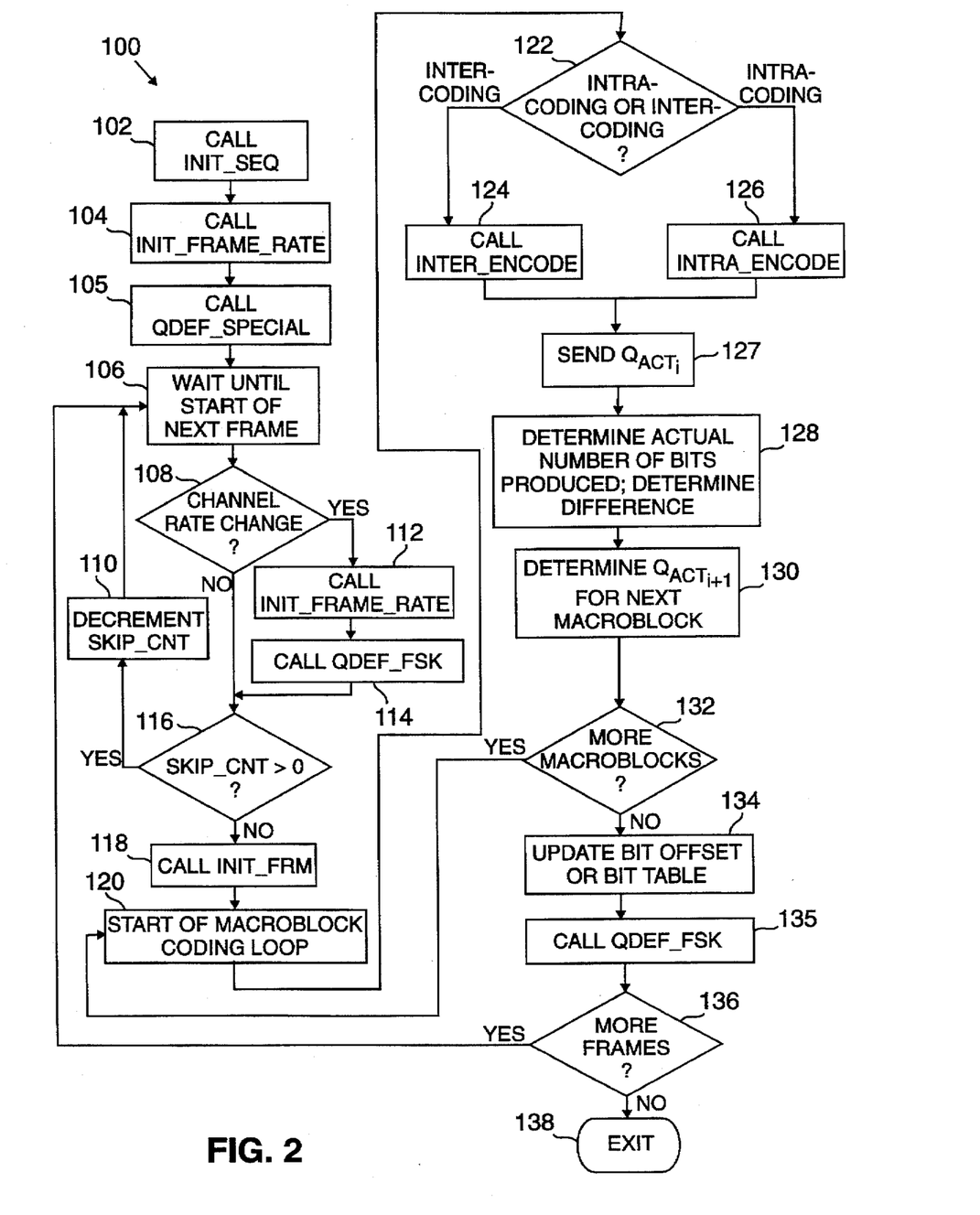
FIG. 2 is a flow chart of the operations performed by the processor of FIG. 1 to provide quantization and buffer control in accordance with the present invention.

FIG. 2 is a flow chart 100 of the detailed operation of the processor 30 of the encoder 18 of FIG. 1 in providing quantization and buffer control in accordance with the present invention. The flow chart 100 describes a exemplary program for execution by the processor 30. In this embodiment, a video frame is divided into macroblocks, each macroblock consisting of a block of pixels. The encoder 18 encodes each frame on a block by block basis. It is to be understood that other programs may be provided by one skilled in the art to implement the teachings of the present invention.

The flow chart 100 begins with the initialization of a number of compression parameters. In step 102, in the INIT_SEQ routine, the processor 30 receives and stores compression parameters from the operator entry device 32. The compression parameters include the channel bit rate, the number of frames to be skipped, the target buffer fullness, and the correlation table between the bit budget value and the Q-step values. A brief discussion of the above discussed parameters is provided below.

The first parameter, the channel bit rate, R, is the rate at which the channel 35 transmits video data, and is often dictated by a standard. For example, a typical 2B+D ISDN video channel allows a data rate of 128 kbits/sec per channel, 112 kbits/sec for video and 16 kbits/sec for audio and control. Thus, in the case of a 2B+D ISDN channel, R=112 kbits/sec.

The second parameter, the number of frames to be skipped, FSK, is the number of frames of video data that are not encoded for every frame that is encoded. The initial FSK is selected to reduce the required data compression ratio to a reasonable level. The data compression ratio, CR, is given by, $$CR = (\text{source video bits/sec})/(R).$$

Whether or not CR is reasonable will depend on the encoder technology and will be known to those of ordinary skill in the art.

For example, consider an ISDN channel and a video source that provides 30 frames per second, each frame having 180×144 picture elements or pixels, and each pixel having 12 bits of data. With the ISDN channel rate of 112 kbits/sec, the required compression ratio would be CR=(12)(180)(144)(30)/(112,000), which equals 83. Thus, without frame skipping the quantizer would need to achieve 83:1 compression ratio, which is not realistic given the currently available techniques. If, however, only every third frame is encoded, or in other words, if FSK=2, then the compression ratio drops to approximately 28:1, which is more reasonable. The value of FSK is set initially for each system depending on these constraints, and would be known to those of ordinary skill in the art. Improvements in encoding technology will of course increase the acceptable range of compression ratios.

The third parameter, the target buffer fullness, TBF, is a system parameter that expresses the ideal fullness of the buffer 26 at the end of encoding each frame. The present invention uses the TBF to regulate the number of bits that are encoded for each frame to ensure a consistent data flow. The TBF value is determined such that it satisfies two competing factors. The first factor is the prevention of overflow. An overflow of data into the buffer may cause data loss. The second factor is the prevention of underflow. If the buffer 26 underflows and becomes empty, non-video stuffing data is transmitted, which wastes the channel capacity.

A typical value of TBF is given by:

$$TBF = (FSK + C) * R/FR,$$

where FR is the source video frame rate, typically 30 frames per second, and C is a constant, typically at least 1.5 and preferably 3.0 for low bit rate channels.

The last parameter, which is the correlation table between the bit budget value and the Q-step value, quantifies the relationship between the number of bits available to encode a frame and the resulting picture quality. The table contains a plurality of Q-step values, and for each Q-step value, an estimate of the number of bits that would be required to encode a frame using that Q-step value.

Because the precise number of bits required can only be ascertained by actually quantizing the frame, the table can only provide an estimate. An exemplary correlation table between Q-step value $Q_{DEF}$ and bit budget value $BIT[Q_{DEF}]$ is shown in Table 1, below.

TABLE 1

| $Q_{DEF}$ | Bit Budget ($BIT[Q_{DEF}]$) |
|---|---|
| 2 | 40,000 |
| 3 | 32,000 |
| 4 | 30,000 |
| . | . |
| . | . |
| . | . |
| 30 | 250 |
| 31 | 200 |

The encoder uses the table to choose a Q-step value that corresponds to a particular bit budget value. For example, if the processor 30 determines that there are 30,000 bits available to encode the next frame, then it consults the correlation table to determine that a Q-step value of 4 would be appropriate. If a Q-step value of 4 is then used, approximately 30,000 bits of data will be used to encode the ensuing frame. It should be noted that the values shown above are exemplary. The relationship between the Q-step value and the bit budget value is based in part on the picture resolution, the nature of the image, and any motion in the image. Suitable methods of determining the table values are known to those of ordinary skill in the art.

Returning to the description of the flow diagram in FIG. 2, after the parameters described above are established in step 102, the routine INIT_FRAME_RATE determines the minimum and maximum number of frames to be skipped, $FSK_{min}$ and $FSK_{max}$, and the minimum and maximum target buffer fullness for the encoder buffer 26, $TBF_{min}$ and $TBF_{max}$, in step 104. These values set a tolerance level for variation from the initial FSK and TBF levels determined in step 102. Ordinarily $FSK_{min}$ may be as low as 0 and $FSK_{max}$ is at least one more than the nominal FSK. These values can be entered via operator entry device 32 and may vary based on experience and the particular application. Any of the values or parameters may also be set automatically by a program run by the processor 30.

In step 105, a routine called QDEF_SPECIAL is called. The routine QDEF_SPECIAL sets the bit budget value and the Q-step value for the first frame to be coded. Ordinarily, the first frame should be quantized using a low Q-step value to provide a good initial picture quality. Accordingly, the bit budget value is set high and the default Q-step value $Q_{DEF}$ is set low. The appropriate values for encoding the first frame will vary depending upon the particular application and would be known to those of ordinary skill in the art. In addition, a frame skipping counter, SKIP_CNT, which is discussed further below, is set equal to zero.

After initialization, the processor 30 begins a frame skipping loop. First, in step 106, the processor 30 waits until the start of a new frame. Next, in step 108, the processor 30 determines whether a change in the channel rate R of the channel 35 has been received via the operator entry device 32. If there has been a change in the channel rate R on channel 35, then the processor 30 executes step 112. Otherwise, the processor proceeds to step 116, discussed below.

In step 112, the routine INIT_FRAME_RATE is again called to initialize the $FSK_{min}$, $FSK_{max}$, $TBF_{min}$, and $TBF_{max}$ values. After step 112, in step 114, a routine named QDEF_FSK is executed. The QDEF_FSK routine is described in more detail in connection with step 135 of this flow diagram as well as FIGS. 3A and 3B. In general, the QDEF_FSK routine determines a bit budget value for the next frame and retrieves a corresponding default Q-step value by consulting the correlation table, such as the one shown in Table 1. The resulting Q-step value $Q_{DEF}$ is used in the ensuing steps for quantizing the frame. The processor 30 thereafter executes step 116.

In step 116, the processor 30 uses the variable SKIP_CNT to skip the appropriate number of frames before encoding is performed. The processor 30 skips a frame by maintaining the switch 22 in FIG. 1 in an "off" state for the duration of the frame so that the frame cannot be provided to the quantization circuit 24. For example, if SKIP_CNT is first set equal to 3, the processor 30 determines that SKIP_CNT is greater than zero at step 116 of FIG. 2, loops back to decrement SKIP_CNT in step 110, maintains the switch 22 in an "off" state, and then returns to step 106. Assuming there is no change in the channel rate R of channel 35, the frame skipping loop cycles and the switch 22 remains in an off state until the proper number of frames of the input digital video signal have been skipped. For the first frame, SKIP_CNT equals zero, and therefore no frames are skipped. For subsequent frames, SKIP_CNT is set equal to FSK in step 135, discussed below.

Once the appropriate number of frames have been skipped, or in other words, the answer in step 116 is "no," then the processor 30 begins encoding the current frame. Accordingly, in step 118, the routine INIT_FRM is executed to initialize additional parameters. In INIT_FRM, a macroblock counter i, is initialized to zero to indicate that the first macroblock of the frame will be encoded. In addition, the processor initializes the actual produced bit count in bit counter 28 of FIG. 1 to zero.

Thereafter, step 120 starts a macroblock coding loop. To this end, the switch 22 is enabled to allow the next macroblock of the current frame data to be provided to the quantizer 24. Then, in step 122, the processor 30 determines whether this particular macroblock, block i, is to be quantized using intracoding or intercoding. Suitable intracoding and intercoding techniques, and the method for determining which should be used, are known in the art. If, in step 122, the processor determines that interframe coding is appropriate, then the processor 30 calls the procedure INTER_ENCODE in step 124. Otherwise, the processor 30 calls the procedure INTRA_ENCODE in step 126. In either case, the processor 30 sends a control signal to the quantization circuit 24 indicating whether intracoding or intercoding is to be performed.

After the encoding technique is chosen, in step 127, the processor 30 sends the actual Q-step value for the current macroblock, $Q_{ACT_i}$ to the quantization circuit 24. For the first macroblock in a frame, $Q_{ACT_i}$ is equal to the retrieved default Q-step value $Q_{DEF}$ for the frame. For other macroblocks, $Q_{ACT_i}$ is equal to a number calculated in step 130, discussed below. In any event, the quantization circuit 24 retrieves the current macroblock of the current video frame. The macroblock is then compressed by the quantization circuit 24 in accordance with $Q_{ACT_i}$ and the compressed bits are sent to the encoder buffer 26.

In step 128, the bit counter 28 determines the actual number of bits produced by the quantization circuit 24 for the first macroblock, which generally differs from the amount expected given the $Q_{ACT_i}$ value. The bit counter 28 then provides the actual number to the processor 30, which in turn computes the difference between the actual number of bits produced minus the expected number of bits. The expected number of bits is determined by:

Expected=(Bit Budget)*(i/(macroblocks per frame)).

For example, if the initial bit budget value was 2000 bits and one out of a total of 100 macroblocks has been encoded, then the portion expected for one macroblock is 1% of 2000 bits or 20 bits.

In step 130, the difference between the bits produced and the bits expected is used to determine the actual Q-step value for compressing the next macroblock, $Q_{ACT_{i+1}}$, which, for example, is $Q_{ACT_2}$ for the second macroblock. To this end, a temporary Q-step value, $Q_{TEMP}$, is determined by adding a linear adjustment to $Q_{ACT_i}$. This linear adjustment may suitably be equal to the expected number of bits produced for the block i minus the actual number of bits produced. Other adjustments may suitably be employed.

After such adjustment, $Q_{TEMP}$ is rounded off to the nearest integer. A decision is then made whether to change $Q_{ACT_{i+1}}$ to equal $Q_{TEMP}$. If $Q_{TEMP}$ is less than $Q_{ACT_i}$, or greater than three plus $Q_{ACT_i}$, then $Q_{ACT_{i+1}}$ is set to $Q_{TEMP}$. Otherwise, $Q_{ACT_{i+1}}$ is equal to $Q_{ACT_i}$. This updating of the actual Q-step value from macroblock to macroblock is done to keep the actual number of bits produced for the frame close to the adjusted bit budget value. This updating step requires $Q_{TEMP}$ to exceed $Q_{ACT_i}$ by at least three in order to avoid frequent, minor changes in the actual Q-step value. Other suitable adjustments may be employed in place of the one described above.

In step 132, the processor 30 determines whether there are more macroblocks to quantize in the current frame. If so, then the processor 30 returns to step 120 and increments the macroblock number. The next macroblock is compressed in the same manner as the previous macroblock except that the newly calculated Q-step value $Q_{ACT_{i+1}}$, is used.

Step 134 is executed when all the macroblocks in a frame have been encoded. In step 134, a bit offset is calculated which is used to update the bit budget value in the ensuing frame. The bit offset is used as an adjustment that accounts for the difference between the bits actually produced for each block in the frame and the bits expected to be produced. The adjustment is made in the QDEF_FSK routine during the processing of the next frame.

To determine the offset, an average Q-step value, $Q_{AVE}$, is determined. $Q_{AVE}$ is equal to the sum of the actual macroblock Q-step values, $Q_{ACT_1}$, $Q_{ACT_2}$, and so forth, divided by the number of macroblocks encoded. In addition, the processor 30 retrieves a bit budget value from the correlation table in memory 34 which corresponds to $Q_{AVE}$. This retrieved bit budget value BIT[$Q_{AVE}$] is referred to as the average produced bit budget value. Next, the processor 30 determines the difference, $\Delta_b$, between the actual number of bits produced, N, for the entire frame by the quantization circuit 24 and the average produced bit budget value BIT[$Q_{AVE}$]. The difference $\Delta_b$ is preferably used as a bit offset for the next frame. The bit offset may then be used to adjust the initial bit budget before determining the appropriate Q-step value in the QDEF_FSK routine, as discussed below in connection with FIG. 3A.

Alternatively, the difference $\Delta_b$ can be used to adjust each bit budget value in the correlation table in the memory 34 according to the following formula:

BIT[$Q_{DEF}$]+0.25*$\Delta_b$, where $Q_{DEF}$ is preferably an integer ranging from 2 to 31.

After the processor 30 has updated the bit offset value or the plurality of bit budget values, the routine QDEF_FSK is called at step 135. In this routine, as discussed below in connection with FIGS. 3A and 3B, several of the quantization and buffering parameters, including the Q-step value, are determined for the next frame. In general, the QDEF_FSK routine first computes an initial bit budget value for the next frame. The initial budget value may then be adjusted by the bit offset value. The QDEF_FSK routine then retrieves one of the plurality of default Q-step values based on the bit budget value using the correlation table, such as shown in Table 1. If the retrieved quantization step size exceeds a threshold, $Q_{max}$, then FSK and/or TBF are adjusted accordingly to increase the bit budget value and thus reduce the required Q-step value. Finally, the routine also sets a counter SKIP_CNT equal to FSK.

Next, in step 136, the processor 30 determines if there are more frames. If so, then processor returns to step 106 and starts the process again. If, however, there are no more frames, the encoding routine is exited in step 138.

Figure 3A:
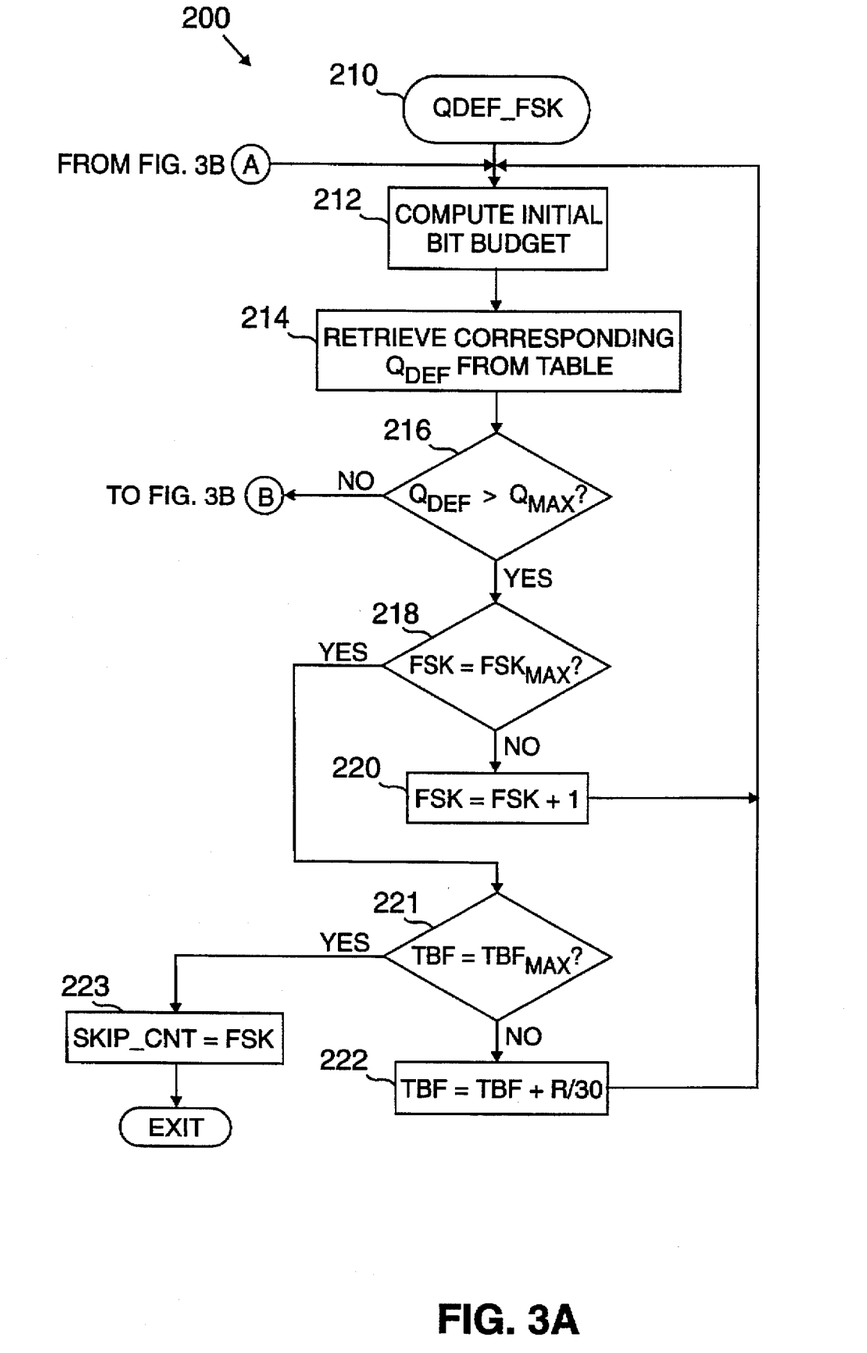
FIGS. 3A and 3B are sections of a flow chart of a routine which may suitably be used to determine and adjust the number of frames to be skipped and the target buffer fullness.
Figure 3B:
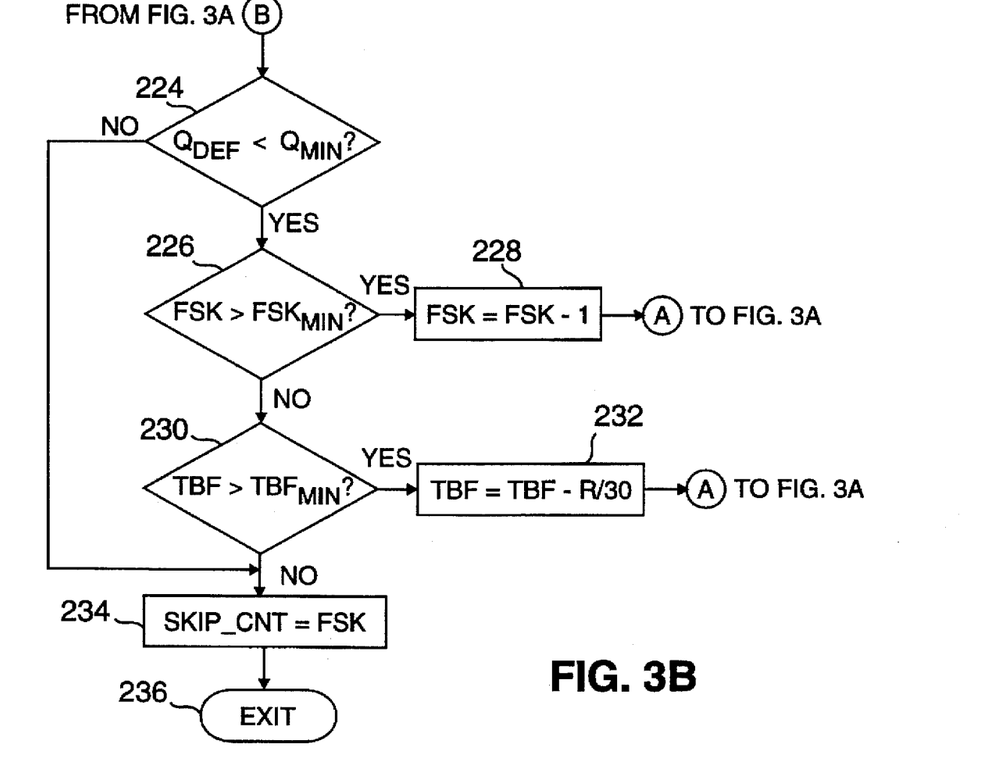

FIGS. 3A and 3B are two sections of a flow chart 200 of the QDEF_FSK routine that is called within the flow chart 100 of FIG. 2. Step 210 is the start of the routine. In step 212, the processor 30 computes the initial bit budget in the following manner. First, the processor obtains the values of R, TBF, FSK and the current buffer fullness, CBF, all of which may be found in the encoder buffer 26 or in a memory connected to the processor 30. Then the processor 30 preferably determines the initial bit budget value ("INIT") such that it satisfies the following formula:

$$INIT=TB-CBF+(FSK+1)*R/30.$$

Other suitable formulas, depending on the application, may be used by those of ordinary skill in the art. In addition, if a bit offset was calculated in step 134, the bit offset may be added to the initial bit budget value to produce an adjusted bit budget value.

In step 214, the default Q-step value corresponding to the adjusted bit budget value is retrieved by the processor 30 from the table in memory 34. The table may be of the form shown in Table 1, above. Next, in step 216, the processor 30 determines whether the retrieved default Q-step value is greater than the maximum Q-step value, $Q_{max}$. $Q_{max}$ is preferably set to a level that produces a maximum tolerable video degradation level, which would be known to those of ordinary skill in the art. If so, the processor executes step 218. If not, the processor executes step 224 as illustrated in FIG. 3B.

In step 218, it is determined whether the FSK value is equal to the maximum FSK value, $FSK_{max}$. If not, the processor 30 increments the FSK value in step 220 and stores the new FSK value in memory 34. If, however, FSK is equal to $FSK_{max}$, then the processor 30 executes step 221.

In step 221, the processor determines whether the target buffer fullness is equal to the maximum target buffer fullness, $TBF_{max}$. If so, then in step 223, SKIP_CNT is set equal to FSK and the routine QDEF_FSK is exited. If not, then in step 222, R/30 is added to the target buffer fullness.

After either step 220, in which FSK is increased, or step 222, in which TBF is increased, the processor 30 loops back to step 212 to compute an updated initial bit budget value and an updated adjusted bit budget value, and to retrieve a new default quantization step size from the table in memory 34 of FIG. 1.

FIG. 3B is a continuation of the flow diagram illustrated in FIG. 3A. In accordance with the invention, the processor only executes the flow diagram in FIG. 3B if in step 216 it is determined that $Q_{DEF}$ is not greater than $Q_{max}$, or in other words $Q_{DEF}$ does not exceed the threshold.

In step 224, the processor determines whether $Q_{DEF}$ is less than its minimal threshold, $Q_{min}$. Although it is ordinarily advantageous to minimize the Q-step value when possible, there is a point in which it may instead be more advantageous to reduce FSK or TBF. In particular, if FSK and/or TBF have been increased in excess of their nominal values in prior frames, then they may be decreased when the Q-step value is at or below $Q_{min}$. Accordingly, if the answer in step 224 is yes, the processor executes step 226. Otherwise, the processor executes step 234.

In step 226, the processor determines whether FSK is greater than its minimum threshold, $FSK_{min}$. If so, the value of FSK is decremented in step 228 and the processor returns to step 212. If in step 226, however, FSK is not greater than $FSK_{min}$, then the processor proceeds to step 230.

In step 230, the processor queries whether TBF is greater than the minimum threshold, $TBF_{min}$. If so, the value of TBF is decremented in step 232 and the processor returns to step 212. If not, however, the processor proceeds to step 234.

In step 234, the value of SKIP_CNT is set equal to FSK and then the routine QDEF_FSK is exited.

It is to be understood that the above-described embodiments of the invention are merely illustrative. Other implementations may readily be devised by those skilled in the art which will embody the principles of the invention and fall within the spirit and scope thereof. For example, the system 10 of FIG. 1 includes a general encoder circuit 18, which in some cases, may further include a motion compensation block and an associated discrete cosine transform block located between the switch 22 and the quantizer 24. Other encoding schemes which have been developed or will be developed may also be used in conjunction with the techniques of the present invention.

We claim:

1. A method for quantizing and buffering a digital signal for use in a digital signal compression system, said digital signal comprising one or more frames, each frame comprising one or more blocks, the system having a default number of frames to be skipped and a bit budget value for a buffer based on the default number of frames to be skipped, the method comprising:

establishing a maximum allowable step-size value ("maximum Q-step value"), said maximum Q-step value being selected to insure an acceptable frame quality;

determining a quantization step-size value default ("default Q-step value") based on the bit budget value;

determining whether the default Q-step value is greater than the maximum Q-step value, and if the default Q-step value is greater than maximum Q-step value, then increasing the number of frames to be skipped,
   updating the bit budget value, and
   updating the default Q-step value to a value based on the updated bit budget value;

selecting an actual Q-step value based on the updated default Q-step value; and quantizing a block of a frame of an input digital signal based on the actual Q-step value.

2. The method of claim 1 further comprising the step of:

determining if the updated default Q-step value is greater than the maximum Q-step value and the number of frames to be skipped is equal to a maximum number of frames to be skipped, and if the updated default Q-step value is greater than the maximum Q-step value and the number of frames to be skipped is equal to the maximum number of frames to be skipped, then increasing the target buffer fullness,
   updating the bit budget value, and
   updating the default Q-step value to a value based on the updated bit budget value.

3. The method of claim 1 wherein the step of determining the bit budget value comprises determining an initial bit budget value and adding a bit offset value, said bit offset value based upon a bit budget value for a previous frame and an actual number of bits produced in the previous frame.

4. The method of claim 3 wherein the step of quantizing a frame comprises producing an actual number of bits, the method further comprising the steps of:

determining the actual number of bits produced during the step of quantizing the input digital signal;

determining the difference between the actual number of bits produced by quantizing and the initial bit budget value; and updating the bit offset value based on the difference between the actual number of bits produced by quantizing and the initial bit budget value.

5. The method of claim 4 wherein the input digital signal is a video signal.

6. The method of claim 1 wherein the step of quantizing a frame comprises producing an actual number of bits, and the method further comprises the steps of:

determining the actual number of bits produced during the step of quantizing the frame of the input digital signal;

determining the difference between the actual number of bits produced during the step of quantizing the frame and the bit budget value; and updating a subsequently calculated default Q-step value based on the difference between the actual number of bits produced by quantizing and the bit budget value.

7. The method of claim 6 wherein the input digital signal is a video signal.

8. The method of claim 1 wherein the input digital signal is a video signal.

9. The method of claim 1 wherein the step of quantizing a frame of the input digital signal further comprises the steps of a) quantizing a first macroblock of the frame using the default Q-step value;

b) determining the number of bits produced for the first macroblock;

c) adding an adjustment to the default Q-step value based on the difference between the number of bits produced for the first macroblock and a portion of the bit budget value expected for the first macroblock to produce an adjusted default Q-step value;

d) quantizing a subsequent macroblock based on using the adjusted default Q-step value;

e) adding a further adjustment to the adjusted default Q-step value based upon a number of bits produced for the subsequent macroblock; and f) repeating steps d) and e) for a plurality of subsequent macroblocks.

10. The method of claim 9 wherein step c) further comprises increasing a default Q-step value by predetermined amount if the difference between the number of bits produced and the portion of the bit budget value expected for the first macroblock exceeds a predetermined upper limit.

11. The method of claim 9 wherein step c) further comprises decreasing a default Q-step value by a predetermined amount if the difference between the number of bits produced and the portion of the bit budget value expected for the first macroblock is lower than a predetermined lower limit.

12. A method for providing quantization and buffering of a digital signal for use in a digital signal compression system, said digital signal comprising one or more frames, each frame comprising one or more blocks, the system having a default target buffer fullness and a bit budget value for a buffer based on the target buffer fullness, the method comprising:

establishing a maximum allowable step-size value ("maximum Q-step value"), said maximum Q-step value being selected to insure an acceptable frame quality;

determining a default Q-step value based on the bit budget value;

determining if the default Q-step value is greater than the maximum Q-step value;

if the default Q-step value is greater than the maximum Q-step value, then increasing the target buffer fullness, updating the bit budget value, and updating the default Q-step value to a value based on the bit budget value;

selecting an actual Q-step value based on the default Q-step value; and quantizing a frame of an input digital signal based on the actual Q-step value.

13. An apparatus for compressing and displaying a digital video signal, said video signal comprising a plurality of frames, the apparatus comprising:

a) a digital video signal source;

b) an encoder connected to the digital video signal source, the encoder comprising a processor connected to a quantization circuit and a memory for storing a plurality of bit budget values and a corresponding plurality of default Q-step values, the processor operable to establish a maximum allowable step-size value ("maximum Q-step value"), said maximum Q-step value being selected to insure an acceptable picture quality;

determine a first bit budget value for a frame, retrieve a default Q-step value from memory, said default Q-step value corresponding to the first bit budget value, and adjust the default Q-step value if the retrieved default quantization size exceeds the maximum Q-step value, and send the adjusted Q-step value to the quantization circuit, wherein said quantization circuit quantizes the frame using the adjusted Q-value.

14. The apparatus of claim 13 further comprising:

a decoder operatively connected to the encoder; and a video display connected to the decoder.

15. The apparatus of claim 14, wherein the decoder is operatively connected to the encoder by a transmission channel.

16. An apparatus for providing quantization and buffering of a digital signal, the digital signal comprising a plurality of frames, the apparatus comprising:

a) a quantization circuit having an input for receiving an input digital signal and an output for supplying a quantized digital signal, said quantization circuit operable to quantize a frame of the input digital signal based on a Q-step value;

b) an encoder buffer connected to the output of the quantization circuit;

c) a memory connected to the processor, the memory including a table of a plurality of default Q-step values and a corresponding plurality of bit budget values;

d) a processor connected to each of the quantization circuit, the encoder buffer and the memory, wherein the processor is operable to establish a maximum Q-step value, the maximum Q-step value being selected to insure an acceptable frame quality, determine a first bit budget value for a frame, retrieve from the table a default Q-step value based on the first bit budget values, adjust the default Q-step value if the retrieved default quantization step size exceeds the maximum Q-step value, and provide the adjusted default Q-step value to the quantization circuit.

17. The apparatus of claim 16 wherein the processor is further operable to determine the first bit budget value by determining an initial bit budget value and adding a bit offset value.

18. The apparatus of claim 17 further comprising:

e) a bit counter connected to the output of the quantization circuit; and wherein the processor is further operable to receive an actual number of bits produced by the quantization circuit after quantization from the bit counter, determine the difference between the actual number of bits produced and the initial bit budget value, and adjust the bit offset value based on the difference between the actual number of bits produced and the initial bit budget value.

19. The apparatus of claim 17 wherein the input digital signal is a video signal.

20. The apparatus of claim 16 wherein the processor is further operable to determine the first bit budget value by computing an initial bit budget value based on a number of frames to be skipped, the number of frames to be skipped initially being set to a default value; and if a retrieved default Q-step value is greater than the maximum Q-step value, then increase the number of frames to be skipped, update the first bit budget value, and update the default Q-step value using the updated first bit budget value.

21. The apparatus of claim 16 wherein the processor is further operable to determine the first bit budget value by computing an initial bit budget value based on a target buffer fullness, the target buffer fullness initially being set to a default value; and if a retrieved default Q-step value is greater than the maximum Q-step value, increase the target buffer fullness, update the first bit budget value, and update the default Q-step value using the updated first bit budget value.

22. The apparatus of claim 16 wherein the processor is further operable to determine the first bit budget value by computing an initial bit budget value based on a number of frames to be skipped and a target buffer fullness, the number of frames to be skipped and the target buffer fullness initially set to default values, and wherein the processor is further operable to determine if the retrieved default Q-step value is greater than a maximum, and if the retrieved default Q-step value is greater than the maximum Q-step value, then increase the number of frames to be skipped and the target buffer fullness, update the first bit budget value, and update the default Q-step value using the table in memory.

23. The apparatus of claim 16 wherein the input digital signal is a video signal.

24. The apparatus of claim 23 wherein the input digital signal is a video signal.

* * * * *